Patented Oct. 20, 1942

2,299,223

UNITED STATES PATENT OFFICE 2,299,223

PROCESS FOR THE CATALYTIC PRODUCTION OF OLEFIN-SULPHUR DIOXIDE COMPOUNDS OF HIGH MOLECULAR WEIGHT

Frederick E. Frey, Robert Dewey Snow, and Walter A. Schulze, Bartlesville, Okla., assignors to Phillips Petroleum Company, Bartlesville, Okla., a corporation of Delaware No Drawing. Original application January 26, 1934, Serial No. 708,520. Divided and this application July 28, 1941, Serial No. 404,431

5 Claims. (Cl. 260—94)

This invention relates to the manufacture of compounds of high molecular weight by the reaction of sulphur dioxide with unsaturated organic compounds, and comprises processes for catalytically inducing or accelerating such reactions; all as more fully hereinafter set forth and as claimed.

This application is a division of our co-pending application, Serial No. 708,520, filed January 26, 1934, renewed June 8, 1938, now U. S. Patent 2,280,818 granted April 28, 1942.

The reaction of sulphur dioxide with conjugated diolefins is well known, and results in two products, one crystalline and one amorphous. The use of anticatalytic compounds, and of high temperatures, has been claimed to favor the exclusive formation of the crystalline modification (Matthews and Strange, U. S. 1,192,259 (1916); Standinger, Ger. 506,839 (1930); Perkins, Can. 329,043 (1933)).

The reaction of sulphur dioxide with mono-olefins was first reported by Matthews and Elder (Brit. 11,635, 1914) who formed amorphous products of high molecular weight by reacting some of the simpler olefins with sulphur dioxide in the presence of sunlight or other source of acting light. More recently, Fitch and Frey (application Ser. No. 599,350, filed March 16, 1932, now U. S. Patent 2,128,932 granted September 9, 1938) have described and claimed the process of inducing and carrying out these reactions in the absence of such source of light, by the use of suitable substances which exert a catalytic effect. Among such substances specifically claimed are oxygen and organic peroxides, salts of silver and monovalent copper, and oxides of nitrogen.

We have found that many other substances will induce and promote the reaction of sulphur dioxide with olefins in the dark. Among such substances are many belonging to the following classes.

I. Nitrates
    A. Inorganic
        (1) Metallic
        (2) Nitric acid
        (3) Ammonium nitrate
        (4) Nitrates of amino compounds, such as $NH_4NO_3$
    B. Organic
        (1) Alkyl, such as $C_2H_5NO_3$
        (2) Aryl
        (3) Nitrates of organic amines
    C. Organometallic, such as phenyl mercuric nitrate II. Nitrites
    A. Dilute nitrous acid
    B. Nitrites of metal and amine compounds
    C. Organic nitrites, alkyl and aryl
III. Perchlorates
IV. Chlorates
V. Dichromates
VI. Chromates
VII. Persulphates
VIII. Organometallic compounds, such as
        Mercury alkyls
        Lead tetraethyl
        Lead tetraphenyl
        Triphenylbismuthine
IX. Ozonides of organic compounds Mixtures of two or more substances from the above classes may be used, provided, of course, that they do not react with each other.

Inasmuch as the reaction between sulphur dioxide and the unsaturated compound occurs generally in the liquid phase, the catalytic substance must either be soluble in the mixture of sulphur dioxide and unsaturated compound, or must react with one of its constituents to form an intermediate compound which is soluble in the reaction mixture. For example, silver nitrate, lithium nitrate, ammonium nitrate, and dilute alcoholic nitric acid, all of which are somewhat soluble in the reaction mixture, carry the reaction rapidly to completion. On the other hand, barium nitrate, zirconium nitrate, titanium nitrate, strontium nitrate and mercuric nitrate, all of which are relatively insoluble in the reaction mixture, do not start the reaction at once, but after a period of induction extending over several days, the reaction begins, and goes to completion at a moderate rate. The fact that the reaction takes place after a period of induction would seem to indicate the possibility that there has been some chemical reaction between the insoluble added substance and something in the olefin-sulphur dioxide mixture to form a soluble catalyst.

The solubility of a catalytic substance may of course depend upon the presence of added materials or diluents in the reaction mixture, or upon the relative proportions of olefin and sulphur dioxide present. Consequently, an accurate, quantitative comparison of the effectiveness of various catalytic substances is difficult. However, the data in the following column will indicate the comparative effectiveness of several compounds when added in the amount of about 0.5 to 1.0 per cent by weight to a mixture of equal volumes of liquid sulphur dioxide and butene-2.

TABLE I

*Percentage conversion of butene-2 to reaction product*

| Catalyst | Time | | | | | | |
|---|---|---|---|---|---|---|---|
| | 4 hr. | 6 hr. | 1 da. | 2 da. | 3 da. | 4 da. | 5 da. | 7 da. |
| Dilute nitric acid | 100 | | | | | | | |
| Lithium nitrate | | 100 | | | | | | |
| Ammonium nitrate | | 100 | | | | | | |
| Ethyl nitrite | | | | 100 | | | | |
| Beryllium nitrate | | | | 60 | | 100 | | |
| Potassium nitrate | | | 10 | 20 | | 80 | 100 | |
| Magnesium perchlorate | | 1 | 10 | | | 95 | 100 | |
| Perchloric acid | | 5 | | | | 75 | 90 | |
| Thallium nitrate | | | 0 | 5 | | 45 | | 55 |
| Calcium nitrate | | | 10 | | 10 | | | |
| Sodium nitroprusside | | | 12 | | 20 | | | 90 |
| Phenyl mercuric nitrate | | | | 50 | | | | 90 |
| Mercuric nitrate | | | 2 | | 15 | | | |
| Triphenylbismuthine | | | 30 | 50 | 75 | | | |
| Tetraethyl lead | | | | | 50 | | 70 | 75 |
| Mercury diethyl | | | | | | | 20 | 30 |
| Mercury di-n-butyl | | | | | | | 25 | 30 |
| Zirconium nitrate | | | 5 | 10 | | | | |
| Titanium nitrate | | | | | 0 | 0 | 0 | |
| Sodium nitrite | | | | | | | | |
| Uranyl acetate | | | | 5 | | 20 | 30 | |
| Barium nitrate | | | | | | | 0 | |
| Strontium nitrate | | | | | | | 0 | |
| Lead nitrate | | | | | | | 0 | |
| Cobalt nitrate | | | | | | | 0 | |
| Isoamyl nitrite | | | | 15 | | | | 20 |
| Sodium chlorate | | | 0 | | 25 | | 30 | |

TABLE I (Continued)

*Percentage conversion of butene-2 to reaction product*

| Catalyst | Time | | | | | |
|---|---|---|---|---|---|---|
| | 9 da. | 15 da. | 21 da. | 26 da. | 35 da. | 45 da. |
| Dilute nitric acid | | | | | | |
| Lithium nitrate | | | | | | |
| Ammonium nitrate | | | | | | |
| Ethyl nitrite | | | | | | |
| Beryllium nitrate | | | | | | |
| Potassium nitrate | | | | | | |
| Magnesium perchlorate | | | | | | |
| Perchloric acid | | | | | | |
| Thallium nitrate | | 100 | | | | |
| Calcium nitrate | 65 | 100 | | | | |
| Sodium nitroprusside | | 100 | | | | |
| Phenyl mercuric nitrate | | 100 | | | | |
| Mercuric nitrate | | 95 | | 100 | | |
| Triphenylbismuthine | 95 | 99 | | | | |
| Tetraethyl lead | 80 | 80 | | 80 | | |
| Mercury diethyl | 40 | 70 | 100 | | | |
| Mercury di-n-butyl | 40 | 60 | 90 | | | |
| Zirconium nitrate | 17 | 75 | 95 | 100 | | |
| Titanium nitrate | 10 | 50 | | 100 | | |
| Sodium nitrite | | 10 | | 80 | 100 | |
| Uranyl acetate | | 60 | | 65 | 70 | |
| Barium nitrate | 0 | 3 | 12 | 20 | 40 | 75 |
| Strontium nitrate | 0 | 15 | 25 | 40 | 40 | 50 |
| Lead nitrate | 0 | 0 | 10 | 20 | 40 | 45 |
| Cobalt nitrate | 0 | 15 | | 20 | 40 | |
| Isoamyl nitrite | | 40 | | 85 | | |
| Sodium chlorate | 35 | | 65 | 65 | | |

In the absence of any such substance, the conversion was never at any time appreciable.

We have also found that the soluble nitrates such as those of lithium or ammonium, or dilute nitric acid, are equally as effective as silver nitrate, mol for mol. Furthermore, they have an advantage in that they do not tend to discolor the product as silver nitrate frequently does, and are not as liable to be precipitated from the reaction mixture by the presence of metals higher in the electromotive series.

We have found that the reaction products of nitric acid and the organic amines, such as n-butyl amine, di-n-butyl amine, tri-n-butyl amine, benzyl amine, and aniline, have much greater solubility in hydrocarbons, and mixtures of sulphur dioxide with hydrocarbons, than have most metallic salts, and that they are effective and suitable for the conduct of our process. Other substances having suitable catalytic properties, and favorable solubility in the reaction mixtures, are nitrolic acids, nitrolates, and psuedonitrols. These more soluble catalytic substances are especially suitable for use in our process when reacting sulphur dioxide with an unsaturated compound in the presence of inert diluents, such as paraffin hydrocarbons.

The above named substances may be conveniently added to the mixture to be reacted, in the form of a finely ground solid; or they may be added in solution in alcohol or other inert organic solvent, and dispersed throughout the mixture by shaking or stirring.

The products obtained in our process with the use of these catalytic substances are practically identical with those obtained by reacting the same unsaturated compound with sulphur dioxide in the presence of sunlight.

Examples of the application of this process are:

I. Equimolecular solutions in absolute ethyl alcohol were prepared as follows: Saturated $AgNO_3$, 1.6 g. $LiNO_3$ per 100 cc., 1.88 g. $NH_4NO_3$ per 100 cc. One-half cc. of one of the solutions was added to a tube containing approximately 80 g. of a mixture of $SO_2$ and butene-2, and the extent of the reaction was observed at various times after warming to room temperature and mixing. The data are given in the following table:

*Per cent conversion to reaction product*

| Catalyst | Time, hours | | | | | | |
|---|---|---|---|---|---|---|---|
| | 1½ | 2 | 3 | 6 | 9 | 14 | 18 |
| $AgNO_3$ | | | | 60 | | 100 | |
| $LiNO_3$ | | | 10 | | | 90 | 100 |
| $NH_4NO_3$ | 10 | 25 | | 90 | 100 | | |

II. To a mixture of equal volumes of sulphur dioxide and olefins contained in an autoclave or other pressure vessel is added from 0.01 per cent to 0.1 per cent, or more, by weight, of one of the substances shown above to exert a catalytic effect upon the reaction. The catalytic substance is dissolved or dispersed throughout the mixture by thorough stirring or shaking, and the reaction is allowed to take place at temperatures within the range of —25° C. to +40° C.

III. To a mixture of equal volumes of allyl alcohol and sulphur dioxide is added 0.5 per cent by weight of lithium nitrate. In a few days, in the dark, the allyl alcohol is completely converted to a solid, white polymer.

In the following claims the phrase "soluble in the reaction mixture," or equivalent language, is to be taken as including substances which are actually soluble in the reaction mixture as well as those which apparently react with the mixture to form soluble compounds having catalytic properties.

Having described our invention, what we claim is:

1. The process of producing high molecular weight heteropolymers of olefins and sulphur dioxide which comprises reacting olefins with sulphur dioxide in the presence of a chlorate.

2. The process of producing high molecular weight heteropolymers of olefins and sulphur dioxide, which comprises conducting the reaction in the absence of actinic light in the presence of a chlorate.

3. In a process in which olefins are reacted with sulphur dioxide to form high molecular weight heteropolymeric products, the improvement which comprises effecting the reaction in the absence of actinic light by introducing into the reaction mixture a chlorate.

4. The process of producing high molecular weight heteropolymers of olefins and sulphur dioxide, which comprises reacting olefins with sulphur dioxide in the presence of sodium chlorate.

5. The process of producing high molecular weight heteropolymers of olefins and sulphur dioxide, which comprises conducting the reaction in the absence of actinic light in the presence of sodium chlorate.

FREDERICK E. FREY.
WALTER A. SCHULZE.
ROBERT DEWEY SNOW.